UNITED STATES PATENT OFFICE.

EDWARD VICTOR EVANS, OF LONDON, ENGLAND.

ELIMINATING SULFUR FROM OILS.

1,257,829.      Specification of Letters Patent.     Patented Feb. 26, 1918.

No Drawing.     Application filed October 25, 1915.   Serial No. 57,885.

*To all whom it may concern:*

Be it known that I, EDWARD VICTOR EVANS, a subject of the King of Great Britain, residing in London, England, have invented certain new and useful Improvements in Eliminating Sulfur from Oils, of which the following is a specification.

It is known that when vapor of oil containing sulfur is heated with hydrogen an elimination of sulfur as sulfureted hydrogen occurs, and in one process which takes advantage of this fact the hydrogen is produced by mixing the oil vapor with superheated steam and passing the mixture over coke heated to redness, the coke at the same time producing intimate contact between the steam and the oil, which is cracked at the temperature used.

By the present invention the whole or a part of the sulfur present in an oil may be eliminated as sulfureted hydrogen by heating the oil in presence of hydrogen or gas containing hydrogen and a catalytic agent or contact substance.

In the case of an oil of suitable boiling point, the vapor of the oil mixed with a small proportion of hydrogen may be passed over the heated catalytic or contact substance and the sulfureted hydrogen may be removed from the vapor by absorption by any known agent for the purpose, or the oil may be washed after condensation to the liquid form.

The process appears to be applicable to all oils containing sulfur. The most efficient temperature of working is in the region of 400-500° C., for at this temperature the iron pipes, which contain the catalyst or contact substance are not destroyed and the velocity of the reaction is so high that a relatively small area of contact is required.

On the other hand, certain oils are decomposed at these temperatures, and when this is to be avoided lower temperatures must be employed. To this end a relatively greater surface of contact will be necessary in order to bring about a similar effect as at 400-500° C. It is necessary therefore to determine with each particular oil the maximum temperature below 500° C., at which the oil is not decomposed and to allow sufficient contact with the catalytic or contact substance to insure that practically the whole of the sulfur of the oil is converted into sulfureted hydrogen. The deposition of carbon on the catalytic or contact substance is not a measure of the extent of the decomposition of the oil, for the sulfur compounds on decomposition yield carbon. The yield of oil before and after treatment is the criterion from which the extent of the decomposition must be judged.

Certain substances act catalytically in promoting the decomposition of sulfur compounds. Nickel, iron, cobalt, copper and numbers of other substances (that have from time to time been proposed for the decomposition of sulfur compounds in coal gas) deposited in porous nuclei or used as such, may be regarded as catalysts to the decomposition, while such substances as pumice, fire-clay, asbestos, etc., appear only to act as promoting contact and are termed simple contact substances. The effect of a catalyst is to reduce the contact necessary and thus the size of plant, and the superiority of reduced nickel, impregnated on a porous medium, such as fire-clay, over, for example, asbestos used as the contact substance, is very marked.

The quantity of nickel required to promote the decomposition of sulfur compounds is so small that hydrogenation of the oil does not take place, or the absence of hydrogenation may be due to the "poisoning" effect of the sulfur.

The process of the present invention involves reversible chemical reactions. The conditions include the presence of a large excess of hydrogen as compared with the sulfur present and of a catalyst. It is well known that when one of the products of a reversible reaction is present in large excess that reaction is much retarded and for a given equilibrium the temperature is higher.

As a typical example of the application of this process, it may be assumed that naphtha is being distilled from crude coal tar. The vapors from the head of the still or at the exit of the fractionating column or dephlegmator, if such be used, are conducted to a furnace maintained at 450° C., and in which steel or iron pipes are contained. A convenient arrangement for these pipes is in the form of a U; the vapors enter at the top of one limb, and in descending are brought to the temperature of the reaction; to enhance this, the limb may be packed with non-combustible material. In the second limb the catalytic material is placed. This may be prepared by steeping highly porous fireclay spheres of about one inch diameter in a solution of nickel chlorid, and reducing the salt by subjecting the spheres to a stream of hydrogen or coal gas at a temperature of 300-350° C.

Assuming that the rate of distillation is 50 gallons per hour, then the volume of each limb of the U tube should be about 7.5 cubic feet. It may be advisable to attain the volume required by a multiple of smaller tubes. The former or preheating limbs may be advantageously filled with fireclay spheres which have not been steeped in nickel salt solution.

A stream of hydrogen or coal gas is introduced at the inlet of the preheating tube or tubes, and allowed to flow with the vapors at the rate of about 400-500 cubic feet per hour when the rate of distillation is 50 gallons per hour. Only a small portion of this hydrogen is actually used, and it is advisable to pump the hydrogen over in a closed circuit consisting of reaction tubes, vapor condenser and receiver, meter, pump.

The sulfureted hydrogen produced, as a result of the decomposition of carbon bisulfid and sulfur compounds, is washed from the condensed vapor by caustic soda solution, or may be extracted direct from the vapor by means of an oxid of iron purifier kept sufficiently warm to prevent condensation.

The periodic revivification of the catalytic material may be conducted by aeration in known manner.

In the case of an oil which cannot be distilled or, indeed, of an oil capable of distillation, the catalytic or contact substance may be introduced into the liquid oil which is suitably heated while hydrogen is passed through it; or the heated oil may trickle over the contact substance while hydrogen is at the same time passing over it.

Having thus described this invention and the best means I know of carrying the same into practical effect, I claim:—

1. A process for eliminating sulfur from oils, which consists in passing the vapor of the oil mixed with a proportion of hydrogen or gas containing hydrogen in excess of the amount of sulfur present over a catalytic agent or contact substance of the type described heated below the temperature at which the vapor decomposes, thereby poisoning the said agent or substance so that hydrogenation does not occur and at the same time converting sulfur into sulfureted hydrogen, and then removing the sulfureted hydrogen from the vapor or oil.

2. A process for eliminating sulfur from naphtha while it is being distilled from crude coal tar, which consists in first mixing the vapor of the naphtha with hydrogen in excess of the amount of sulfur present, then heating the mixture to a temperature of 450° C., then passing the heated mixture over a contact substance or catalyst heated to 450° C., then condensing the vapor, and finally removing sulfureted hydrogen from the condensed vapor.

In testimony whereof I have signed my name to this specification in the presence of two subscribing witnesses.

EDWARD VICTOR EVANS.

Witnesses:
JOSEPH WILLARD,
W. J. SKERTEN.